(12) United States Patent
Kawashima

(10) Patent No.: US 8,570,431 B2
(45) Date of Patent: Oct. 29, 2013

(54) MOBILE ELECTRONIC DEVICE HAVING CAMERA

(75) Inventor: Shinichi Kawashima, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 381 days.

(21) Appl. No.: 12/559,737

(22) Filed: Sep. 15, 2009

(65) Prior Publication Data

US 2010/0194903 A1 Aug. 5, 2010

(30) Foreign Application Priority Data

Feb. 3, 2009 (JP) ................................ P2009-023087

(51) Int. Cl.
*G03B 13/00* (2006.01)
*H04N 5/232* (2006.01)

(52) U.S. Cl.
USPC .......................................... 348/349; 348/345

(58) Field of Classification Search
USPC ................................. 348/345, 349
See application file for complete search history.

(56) References Cited

U.S. PATENT DOCUMENTS

| | | | |
|---|---|---|---|
| 6,888,567 B2 * | 5/2005 | Watanabe | 348/211.8 |
| 7,693,301 B2 * | 4/2010 | Li et al. | 382/103 |
| 8,009,976 B2 | 8/2011 | Nozaki et al. | |
| 2008/0158407 A1 * | 7/2008 | Funamoto | 348/345 |
| 2008/0246852 A1 * | 10/2008 | Mori | 348/222.1 |

FOREIGN PATENT DOCUMENTS

| | | |
|---|---|---|
| JP | 2006-227080 A | 8/2006 |
| JP | 2007-279188 A | 10/2007 |
| JP | 2008-257321 A | 10/2008 |
| JP | 2008-277903 A | 11/2008 |

OTHER PUBLICATIONS

JP Office Action mailed on Nov. 27, 2012 in application No. 2009-023087.
JP Office Action mailed on Jun. 25, 2013 in application No. 2009-023087. Translation of the relevant part, p. 1, line3 to page2, line 17, of the Office Action.

\* cited by examiner

*Primary Examiner* — Anthony J Daniels
(74) *Attorney, Agent, or Firm* — Maschoff Brennan

(57) ABSTRACT

A mobile electronic device including: a camera unit configured to capture a subject image and generate an image signal; a display unit configured to receive the image signal and display a captured image based on the image signal; an acquisition unit configured to acquire detection area information as information about a focusable area that is an area excluding, from the captured image, areas regarded as unfocusable for the camera unit to focus on; a face detection unit configured to detect face-including regions, each of which including face image of the subject and existing in the focusable area from the image signal, based on the detection area information; and a display control unit configured to control the display unit to display face regions on the captured image based on the face-including regions detected by the face detection unit.

1 Claim, 16 Drawing Sheets

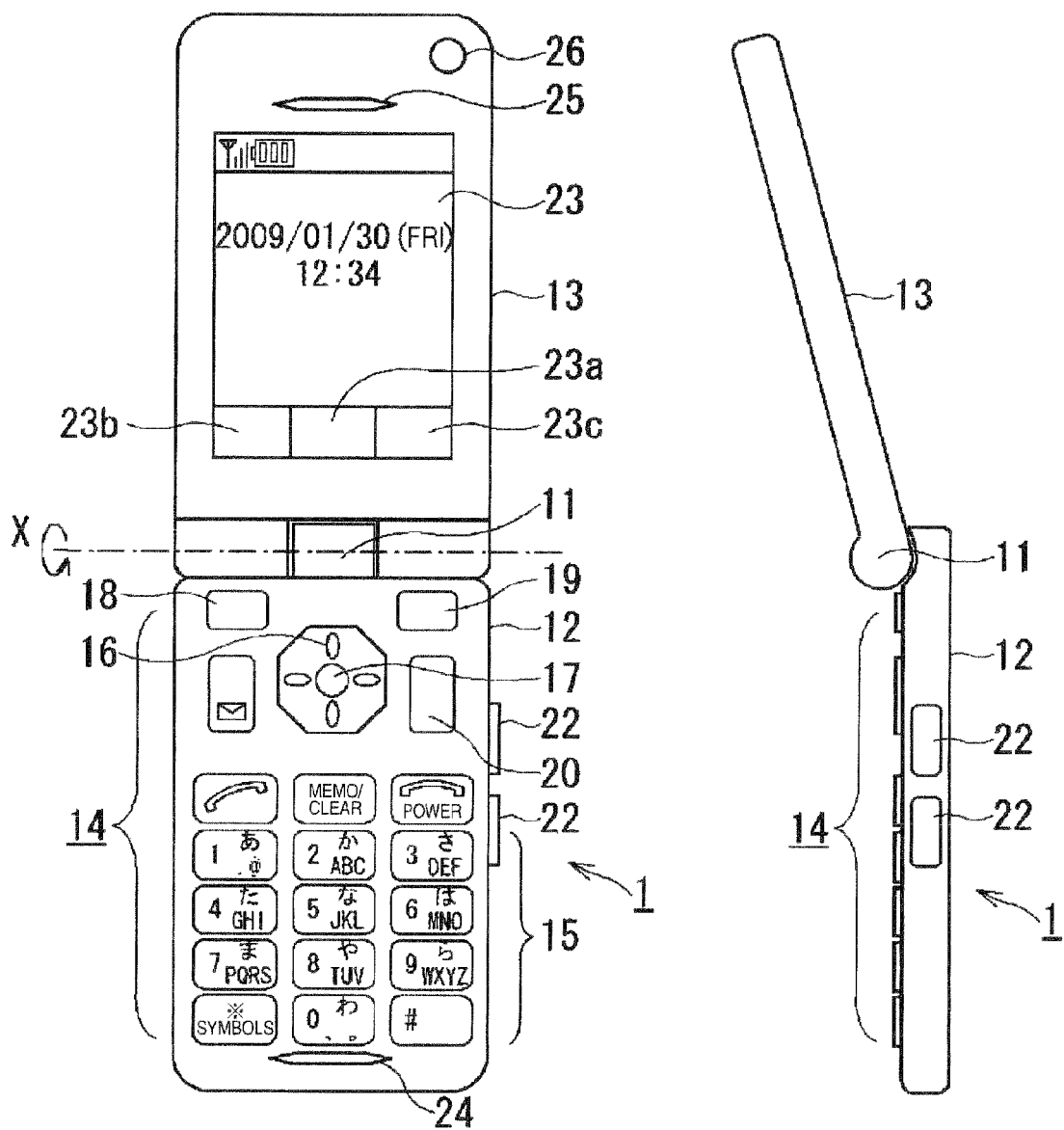

MOBILE ELECTRONIC DEVICE HAVING CAMERA

CROSS REFERENCE TO RELATED APPLICATION(S)

The present disclosure relates to the subject matters contained in Japanese Patent Application No. 2009-023087 filed on Feb. 3, 2009, which are incorporated herein by reference in its entirety.

FIELD

The present invention relates to a mobile electronic device having a camera capable to capture an image and focus on a human face detected in the image.

BACKGROUND

Recently, mobile electronic devices equipped with electronic cameras using image sensors to electronically record subject images have been used widely. Some known electronic cameras provided in such mobile electronic devices have a face detection function. An example of such device is disclosed in JP-A-2006-227080.

The face detection function is a function to detect a subject face existing in a captured image as a face region to automatically focus on the subject face.

In an electronic camera, for reasons related to hardware configuration, there is an "unfocusable area" where a success rate of focusing on a subject is low that the area can be regarded as unfocusable (for example, areas of the upper and lower (left and right) several percentages of a captured image). When the face region of the subject is also detected in the whole image including the unfocusable area, the time of processing for detection may be elongated to spoil the usability. In addition, when a face region which is unfocusable though is displayed, a user may select the face region existing in the unfocusable area as a target of focusing.

The detected face region is displayed on a display of the mobile electronic device together with the captured image. When there are a plurality of subject faces in the captured image, a plurality of face regions are detected by the face detection function. Generally, the display of the mobile electronic device does not have a large display area. Therefore, the maximum displayable number of detected face regions is limited to keep the visibility of a captured image screen.

Here, the user is requested to perform operation to select one face region as a target of focusing from the detected face regions. For example, when the number of subjects is eight, the user has to perform an operation to select one region from detected face regions of the faces of the eight persons.

On this occasion, when the aforementioned maximum displayable number of face regions is set at a large number (for example, eight), all the eight persons who are the subjects will be displayed on the display. However, any other face region than the face region to focus on may be detected concurrently to increase the number of operations for selecting the desired face region.

On the other hand, when the maximum displayable number of face regions is set at a small number (for example, four), only face regions of four of the eight subjects will be displayed. As a result, a face region to focus on may be not displayed on the display. On this occasion, the user has to once put the subjects out of the frame and detect faces again. Thus, undesired rework may occur.

In this manner, when there are a plurality of faces in a captured image, the usability may be spoilt regardless of whether the displayable number of face regions is increased or decreased.

SUMMARY

According to a first aspect of the present invention, there is provided a mobile electronic device including: a camera unit configured to capture a subject image and generate an image signal; a display unit configured to receive the image signal and display a captured image based on the image signal; an acquisition unit configured to acquire detection area information as information about a focusable area that is an area excluding, from the captured image, areas regarded as unfocusable for the camera unit to focus on; a face detection unit configured to detect face-including regions, each of which including face image of the subject and existing in the focusable area from the image signal, based on the detection area information; and a display control unit configured to control the display unit to display face regions on the captured image based on the face-including regions detected by the face detection unit.

According to a second aspect of the present invention, there is provided a mobile electronic device including: a camera unit configured to capture a subject image and generate an image signal; a display unit configured to receive the image signal and display a captured image based on the image signal; a face detection unit configured to detect face-including regions, each of which including face image of the subject and existing in the image signal; and a display control unit configured to control the display unit to display face regions on the captured image based on selected face-including regions, which are selected from among the face-including regions to exist in a focusable area that is an area excluding, from the captured image, areas regarded as unfocusable for the camera unit to focus on.

According to a third aspect of the present invention, there is provided a mobile electronic device including: a camera unit configured to capture a subject image and generate an image signal; a display unit configured to receive the image signal and display a captured image based on the image signal; a face detection unit configured to detect face-including regions, each of which including face image of the subject and existing in the image signal; a display control unit configured to control the display unit to display a first group of face regions of a predetermined number on the captured image based on a first group of the face-including regions selected among the face-including regions detected by the face detection unit when the number of the face-including regions being detected in the captured image is larger than a maximum displayable number; a switch unit configured to control the display unit to switch displaying from the first group of the face regions to a second group of the face regions based on the second group of the face-including regions selected among the face-including regions detected by the face detection unit; a selecting unit configured to select a selected face region from among the face regions being displayed on the display unit; and a focus control unit configured to control focusing the camera unit to set a focus position in a position based on the selected face region.

According to a fourth aspect of the present invention, there is provided a mobile electronic device including: a camera unit configured to capture a subject image and generate an image signal; a display unit configured to receive the image signal and display a captured image based on the image signal; a face detection unit configured to detect face-including regions, each of which including face image of the subject and existing in the image signal; a specific area selection unit configured to select a specific area from the among a plurality of divided areas of a predetermined number defined in the captured image; a display control unit configured to control the display unit to display face regions on the captured image based on the face-including regions existing in the specific area selected by the specific area selection unit; a selecting unit configured to select a selected face region from among the face regions being displayed on the display unit; and a focus control unit configured to control focusing the camera unit to set a focus position in a position based on the selected face region.

According to a fifth aspect of the present invention, there is provided a mobile electronic device including: a camera unit configured to capture a subject image and generate an image signal; a display unit configured to receive the image signal and display a captured image based on the image signal; a specific area selection unit configured to select a specific area from the among a plurality of divided area of a predetermined number in the captured image; a face detection unit configured to detect face-including regions, each of which including face image of the subject and existing in the specific area selected by the specific area selection unit; a display control unit configured to control the display unit to display face regions on the captured image based on the face-including regions detected by the face detection unit; a selecting unit configured to select a selected face region from among the face regions being displayed on the display unit; and a focus control unit configured to control focusing the camera unit to set a focus position in a position based on the selected face region.

According to a sixth aspect of the present invention, there is provided a mobile electronic device including: a camera unit configured to capture a subject image and generate an image signal; a display unit configured to receive the image signal and display a captured image based on the image signal; a face detection unit configured to detect face-including regions, each of which including face image of the subject and existing in a detection priority area preset in the image signal; a display control unit configured to control the display unit to display face regions on the captured image based on the face-including regions detected by the face detection unit; a selecting unit configured to select a selected face region from among the face regions being displayed on the display unit; and a focus control unit configured to control focusing the camera unit to set a focus position in a position based on the selected face region.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIGS. 1A and 1B are views showing an external appearance configuration of a foldable cellular phone as an example of a mobile electronic device according to the invention, in which FIG. 1A is a front view of the external appearance configuration of the cellular phone opened at about 180 degrees; and FIG. 1B is a side view of the external appearance configuration of the opened cellular phone.

FIGS. 2A and 2B are views showing another external appearance configuration of the foldable cellular phone as an example of a mobile electronic device according to the invention, in which FIG. 2A is a front view of the external appearance configuration of the closed cellular phone; and FIG. 2B is a side view of the external appearance configuration of the closed cellular phone.

FIGS. 9A and 9B are views showing display examples of face regions based on detection results of face-including regions, in which FIG. 9A is a view showing a display example of a detection result of face detection performed on the whole of the image signal; and FIG. 9B is a view showing a display example of a detection result of face detection performed upon a focusable area.

FIGS. 13A and 13B are views showing display examples of face regions based on detection results of face-including regions, in which FIG. 13A is a view showing an example where all the detected face regions are displayed as a detection result; and FIG. 13B is a view showing an example where a detection result is displayed while a face region included in an unfocusable area is hidden.

DETAILED DESCRIPTION OF THE EMBODIMENTS

Figure 2A:
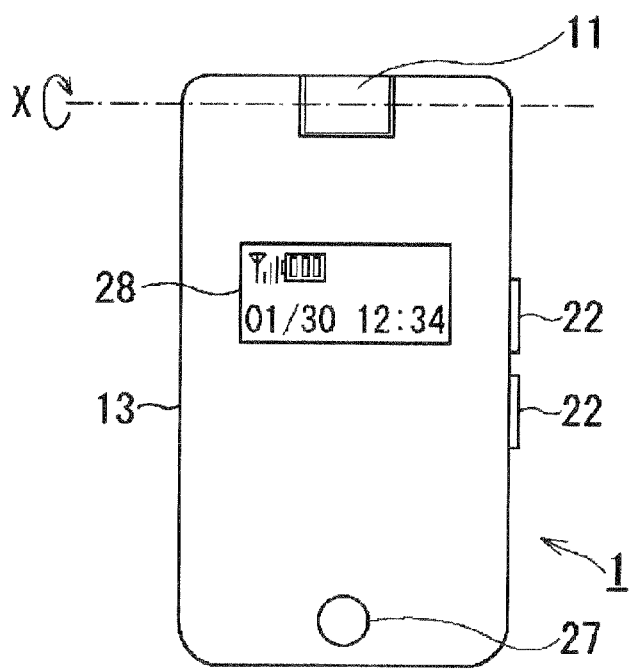

An embodiment of an electronic apparatus according to the invention will be described with reference to the accompanying drawings. FIGS. 1A and 1B are views showing an external appearance configuration of a foldable cellular phone 1 which is an example of a mobile electronic device according to the invention. FIG. 1A shows a front view of the external appearance configuration of the cellular phone 1 opened at about 180 degrees. FIG. 1B shows a side view of the external appearance configuration of the opened cellular phone 1.

As shown in FIGS. 1A and 1B, the cellular phone 1 has a first case 12 and a second case 13 connected in a central hinge portion 11 by a hinge. Thus, the cellular phone 1 is formed foldably in the arrow X direction with the hinge portion 11. An antenna for establishing wireless connection (antenna 38 in FIG. 3 which will be described later) is provided in a predetermined position inside the cellular phone 1. The cellular phone 1 transmits/receives radio waves to/from a base station (not shown) through the built-in antenna.

Operation keys 14 are provided in the surface of the first case 12. Particularly, the operation keys 14 include numeric keys 15, a cross keypad 16, an enter key 17, a left soft key 18, a right soft key 19, a browser key 20, etc. Numerical characters "0" to "9", kana characters from "A" row to "WA" row, or alphabetic characters "A" to "Z" can be inputted through the numeric keys 15. The cross keypad 16 includes up, down, left and right keys.

When the cross keypad 16 is operated up, down, left or right, a cursor etc. displayed on a main display 23 can be moved up, down, left or right. When the enter key 17 is pushed down, a decision process for various processings can be executed. A process displayed in an enter key function display portion 23a provided in a lower portion of the main display 23 is also assigned to the enter key 17.

The left soft key 18 and the right soft key 19 are provided above the cross keypad 16 and the enter key 17 in the first case 12. The browser key 20 for starting up a browser function is provided on the right of the cross keypad 16 and the enter key 17. On a side surface of the first case 12, side keys 22 for operating the cellular phone 1 are provided. Predetermined processes are assigned to the left soft key 18, the right soft key 19 and the side keys 22 respectively. The processes can be executed when the left soft key 18, the right soft key 19 and the side keys 22 are pushed down toward the inside of the first case 12, respectively. Particularly, processes displayed in a left soft key function display portion 23b and a right soft key function display portion 23c provided in the lower portion of the main display 23 are assigned to the left soft key 18 and the right soft key 19 respectively.

In the first case 12, a microphone 24 is provided below the operation keys 14. Voice of a user is collected by the microphone 24 when the user is on the phone.

A not-shown battery package is inserted to the back surface side of the first case 12. When a call-ending/power key is pushed down to turn on the cellular phone 1, power is supplied from the battery package to each circuit to start up the circuit and make it ready for operation.

On the other hand, a main display 23 is provided in the second case 13. The main display 23 occupies a major part of the area of the second case 13. Contents of electronic mails, simplified homepages, etc. as well as the reception condition of radio waves, the remaining battery level, etc. can be displayed on the main display 23. The main display 23 is a display, for example, made of an LCD (Liquid Crystal Display), an organic EL (Electro Luminescence) display or an inorganic EL display. The main display 23 serves as a display unit.

A receiver 25 is provided in a predetermined position of the second case 13 above the main display 23. The user can make verbal communication using the receiver 25. In addition to the receiver 25, a speaker (speaker 35 in FIG. 3) is also provided as a voice output portion in a predetermined position of the cellular phone 1. Further, an internal camera 26 is provided above the receiver 25 in the second case 13. A desired target of photographing can be picked up by the internal camera 26.

Figure 2B:
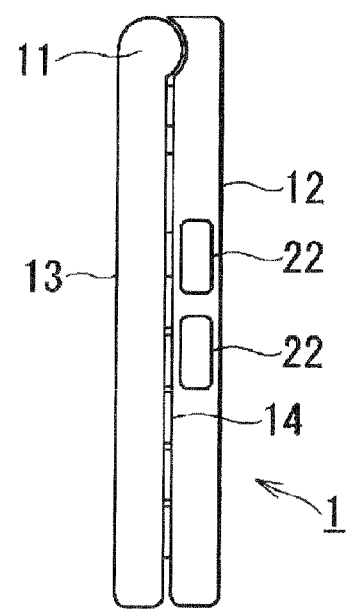

FIGS. 2A and 2B are views showing another external appearance configuration of the foldable cellular phone 1 as an example of a mobile electronic device according to the invention. The cellular phone 1 in FIGS. 2A and 2B has a configuration where the cellular phone 1 is rotated in the arrow X direction from a status shown in FIGS. 1A and 1B to be thereby closed. FIG. 2A shows a front view of the external appearance configuration of the closed cellular phone 1. FIG. 2B shows a side view of the external appearance configuration of the closed cellular phone 1.

An external camera 27 is provided in an upper portion of the second case 13. A desired target of photographing can be picked up by the external camera 27. A sub-display 28 which is, for example, made of an LCD, is provided below the external camera 27 to display an antenna pictogram for indicating the current sensitivity level of the antenna, a battery pictogram for indicating the current remaining battery level of the cellular phone 1, the current time, etc.

Figure 3:
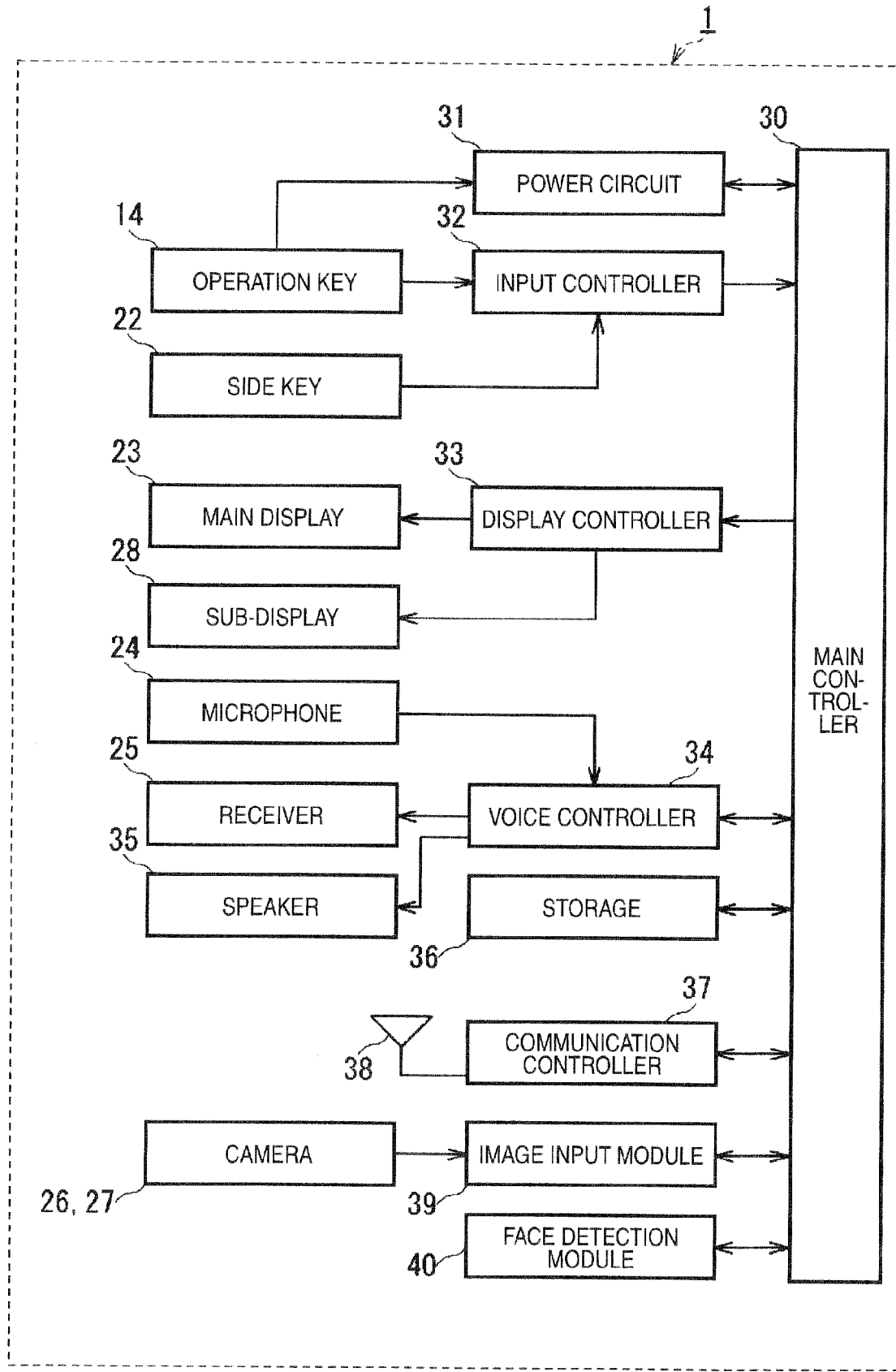
FIG. 3 is a schematic function block diagram showing the main function configuration of the cellular phone according to the embodiment.

FIG. 3 is a schematic function block diagram showing the main function configuration of the cellular phone 1 according to the embodiment. The cellular phone 1 has a main controller 30, a power circuit 31, an input controller 32, a display controller 33, a voice controller 34, a storage 36, a communication controller 37, an image input module 39 and a face detection module 40, which are connected to one another through a bus so as to be able to communicate with one another.

The main controller 30 has a CPU (Central Processing Unit) which operates based on various programs stored in the storage 36 and makes general control of the cellular phone 1. The power circuit 31 has an input interface with a power key of the operation keys 14. On detecting a fact that the power key has been pushed down by the user, the power circuit 31 generates a signal indicating the fact and transmits the signal to the main controller 30. The power circuit 31 has a power source (battery). The power circuit 31 switches the on/off state of the power of the cellular phone 1 based on an input made through the power key. When the power is turned ON, the power circuit 31 supplies electric power to each component from the power source so as to make the cellular phone 1 ready for operation.

The input controller 33 has an input interface with the operation keys 14 and the side keys 22. On detecting that any one of the operation keys 14 and the side keys 22 has been pushed down, the input controller 32 generates a signal for indicating the pushed key and transmits the signal to the main controller 30.

The display controller 33 has a display interface with the main display 23 and the sub-display 28. In accordance with the control of the main controller 30, the display controller 33 displays a captured image based on document data or an image signal inputted from the image input module 39, on the main display 23 or the sub-display 28.

In accordance with the control of the main controller 30, the voice controller 34 generates an analog voice signal from voice collected by the microphone 24, and converts the analog voice signal into a digital voice signal. In addition, on acquiring a digital voice signal, the voice controller 34 converts the digital voice signal into an analog voice signal and outputs the analog voice signal as voice from the receiver 25 in accordance with the control of the main controller 30.

The storage 36 is configured by a ROM (Read Only Memory), a hard disk, a nonvolatile memory, a database, a RAM (Random Access Memory), etc., for processes to be processed by the main controller 30. The ROM stores processing programs or data etc. required for processes. The RAM temporarily stores data to be used when the main controller 30 performs processing.

In addition, a face detection program, data about a face detection area, etc. are stored in the storage 36. The face detection program serves to execute a face detection process to be executed in the cellular phone 1 according to this embodiment.

In accordance with the control of the main controller 30, the communication controller 37 performs spectrum despread processing on a reception signal received from a base station through the antenna 38, so as to restore the reception signal to its original data. In accordance with an instruction of the main controller 30, the data are transmitted to the voice controller 34 to be outputted from the receiver 25 or the speaker 35, or transmitted to the display controller 33 to be displayed on the main display 23, or recorded on the storage 36. On acquiring voice data collected by the microphone 24, data inputted through the operation keys 14 or data stored in the storage 36, the communication controller 37 performs spectrum spread processing on the data and transmits the processed data to the base station through the antenna 38 in accordance with the control of the main controller 30.

The image input module 39 compresses an image signal acquired by the internal camera 26 or the external camera (camera 26, 27) or generates a captured image to be displayed on the main display 23 as a finder based on an image signal acquired at every predetermined time interval. The image input module 39 supplies the acquired image data to the main controller 30.

Each camera 26, 27 has an image sensor made of CCD, CMOS, etc., which serves as an image pickup device for photoelectrically converting an image of a subject from a photographing optical system to thereby generate an image signal. Each camera 26, 27 has a variable-focus mechanism and has at least an autofocusing function.

Based on an image signal inputted from the image input module 39, the face detection module 40 functions as a face detection unit for detecting a subject face-including region existing in the image signal. A known method (for example, a method disclosed in JP-A-2008-257321) may be applied as a method of face detection processing for detecting a face-including region. For example, a method in which the contour of a flesh color region is extracted based on color and a face is detected based on the matching degree with a face contour template prepared in advance, a method in which eye candidate regions are obtained and a face is detected based on the matching degree with an eye template, etc. can be applied. The face detection module 40 outputs to the main controller 30 information about a detected face-including region. For example, the information about a face-including region can be configured by the coordinates of the central point of the face-including region, and the size of the face-including region. In the following description, as a result of face recognition, the face detection module 40 outputs information about a face-including region in the form of the coordinates of the central point of the face-including region and the size of the face-including region, but the information about a face-including region it not limited thereto.

The cellular phone 1 in this embodiment can take still images and video images by the external camera 27 and the internal camera 26 (hereinafter referred to as "camera 26, 27") provided therein.

The cellular phone 1 has a face detection function to detect a subject face-including region existing in a captured image signal when a human being is included in the subject. In addition, the cellular phone 1 has a so-called autofocusing function to control focusing on a position based on one face region selected from face regions displayed based on detected face-including regions. Of processes to be executed in the cellular phone 1, particularly a face detection process for detecting face-including regions from an image signal and a face selection process for selecting one from face regions displayed based on the detected face-including regions will be described below.

Figure 4:
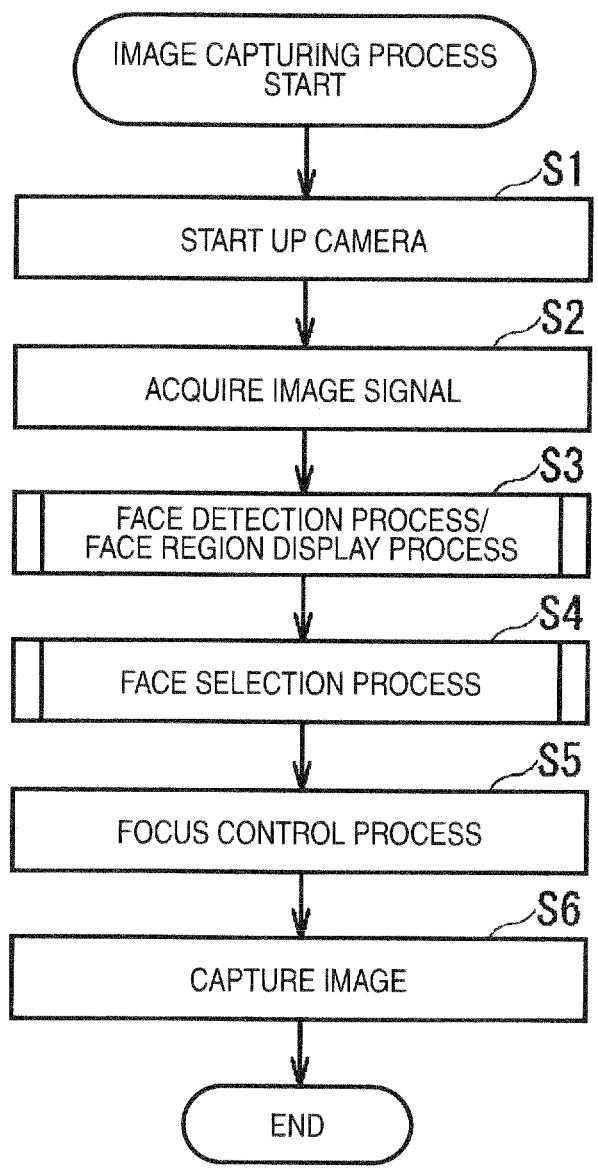
FIG. 4 is a flow chart for explaining the flow of a image capturing process to be executed in the cellular phone according to the embodiment.

First, description will be made on a flow from the time when the camera 26, 27 is started up until a picture is taken using the autofocusing function. FIG. 4 is a flow chart for explaining the flow of a image capturing process in the cellular phone 1 according to the embodiment.

In Step S1, the main controller 30 starts up the camera 26, 27. For example, in response to an instruction accepted through an operation key 14 operated by the user, the main controller 30 starts up the camera 26, 27. On this occasion, the camera to be started up is either the internal camera 26 or the external camera 27. The camera to be started up can be changed over between the internal camera 26 and the external camera 27.

In Step S2, the main controller 30 acquires from the image input module 39 an image signal generated by the camera 26, 27. A captured image generated based on the acquired image signal is displayed on the main display 23. The acquired image signal is output to the face detection module 40. FIGS.

Figure 5A:
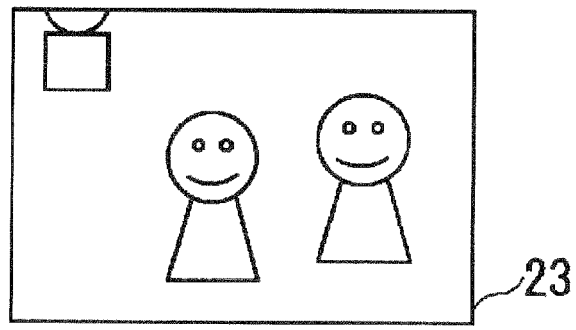
FIGS. 5A-5C are views showing an example in which a captured image based on an image signal is displayed on a main display.
Figure 5B:
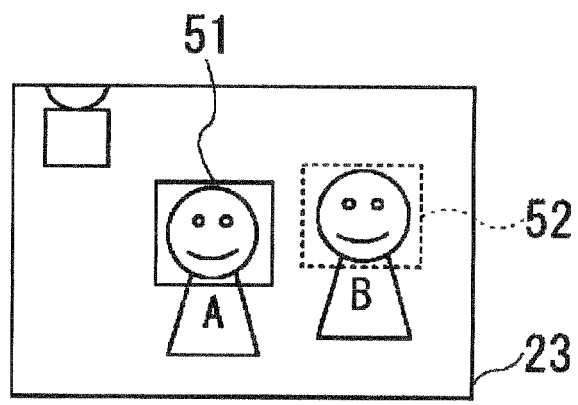
Figure 5C:
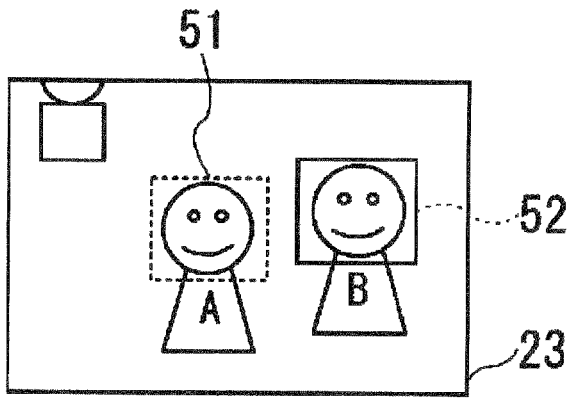

5A-5C are views showing an example in which the captured image based on the image signal is displayed on the main display 23. As shown in FIG. 5A, the captured image is displayed on the main display 23. The user as a user can adjust the composition of the captured image. The example of the captured image displayed on the main display 23 in FIGS. 5A-5C is an example where an image captured by the cellular phone 1 which is shown in FIGS. 1A and 1B and which is turned clockwise or counterclockwise at 90 degrees is displayed on the main display 23.

In Step S3, the main controller 30 controls the face detection module 40 to execute a face detection process in response to an instruction accepted through an operation key 14 operated by the user (for example, an instruction accepted through the "*" key of the numeric keys 15 pushed down by the user). The main controller 30 receives an output of the face detection module 40 which designates a detection result of a face-including region. Based on the detection result of the face-including region, the main controller 30 displays a face region together with the captured image displayed on the main display 23. For example, as an example of a display from for a face region, a square frame with predetermined dimensions centering the coordinates of the central point of the face-including region outputted from the face detection module 40 is displayed as the face region. The display form for a face region is not limited thereto, but any other display form for a face region may be used.

The main controller 30 displays a plurality of face regions when a plurality of face-including regions are detected. When a plurality of face-including regions are detected, a frame displayed as one face region (for example, the face region located the most closely to the center) is displayed in a selected state automatically, while a frame displayed as any other face region is displayed in an unselected state. The selected state designates the state of a face region selected as a target of focusing. One face region is in the selected state just after the detection results of face-including regions (frames to be displayed as face regions) are displayed.

Each "face-including region" designates a subject face-including region detected from the image signal by the face detection module 40. Each "face region" designates a region indicated by a rectangular frame displayed together with the captured image on the main display 23 based on the detection result of the face-including region outputted from the face detection module 40.

FIG. 5B is a view showing an example where the face detection process is executed and frames to be displayed as face regions are displayed on the main display 23 together with the captured image. As shown in FIG. 5B, frames 51 and 52 to be displayed as face regions are displayed together with the captured image. In the example of FIG. 5B, the frame 51 displayed as a face region in the selected state is shown by the solid line, while the frame 52 displayed as a face region in the unselected state is shown by the broken line. The frames displayed as face regions in the selected state and the unselected state are not limited to those shown by the solid line and the broken line respectively, but may be displayed, for example, in different colors.

In Step S4, the main controller 30 accepts one face region selected from the displayed face regions. The selected face region is determined by a predetermined operation key 14 (for example, the "8" key of the numeric keys 15 (which is preferably another key than the key used for starting the face detection process in Step S3)) pushed down for setting the face region in the selected state). FIG. 5C is a view showing an example where the frame displayed as a face region in the selected state has been changed from the captured image shown in FIG. 5B. For example, when the "8" key of the numeric keys 15 is pushed down in the condition that the frame 51 displayed as the face region of a person A is in the selected state in FIG. 5B, the frame 52 displayed as the face region of a person B is brought into a selected state. That is, the frame displayed as a face region in the selected state is moved from the frame displayed as the face region of the person A to the frame displayed as the face region of the person B.

Step S4 may be omitted when a face desired by the user has been already selected.

In Step S5, when a predetermined operation key 14 (for example, the browser key 20) is pushed down, the main controller 30 executes a focus control process (autofocusing) on a position corresponding to the selected face region. Here, when the focus control process is executed on the position corresponding to the face region, a face-including region including only the face is detected, but any face-including region including another face is not detected. The focus control process may be performed all over the selected face region or may be performed on the central position of the face region.

In Step S6, when a predetermined operation key 14 (for example, the enter key 17) is pushed down, the main controller 30 takes a picture by means of the camera 26, 27 to generate an image signal. The focus control process in Step S5 and the photographing instruction in Step S6 may be executed in response to one operation on the enter key 17.

Next, detailed of the face detection process in Step S3 in the image capturing process of FIG. 4 will be described. The face detection process in the embodiment is a process which will be effective when there is an area that can be regarded as impossible to focus thereon due to the hardware configuration of the camera 26, 27.

Figure 6:
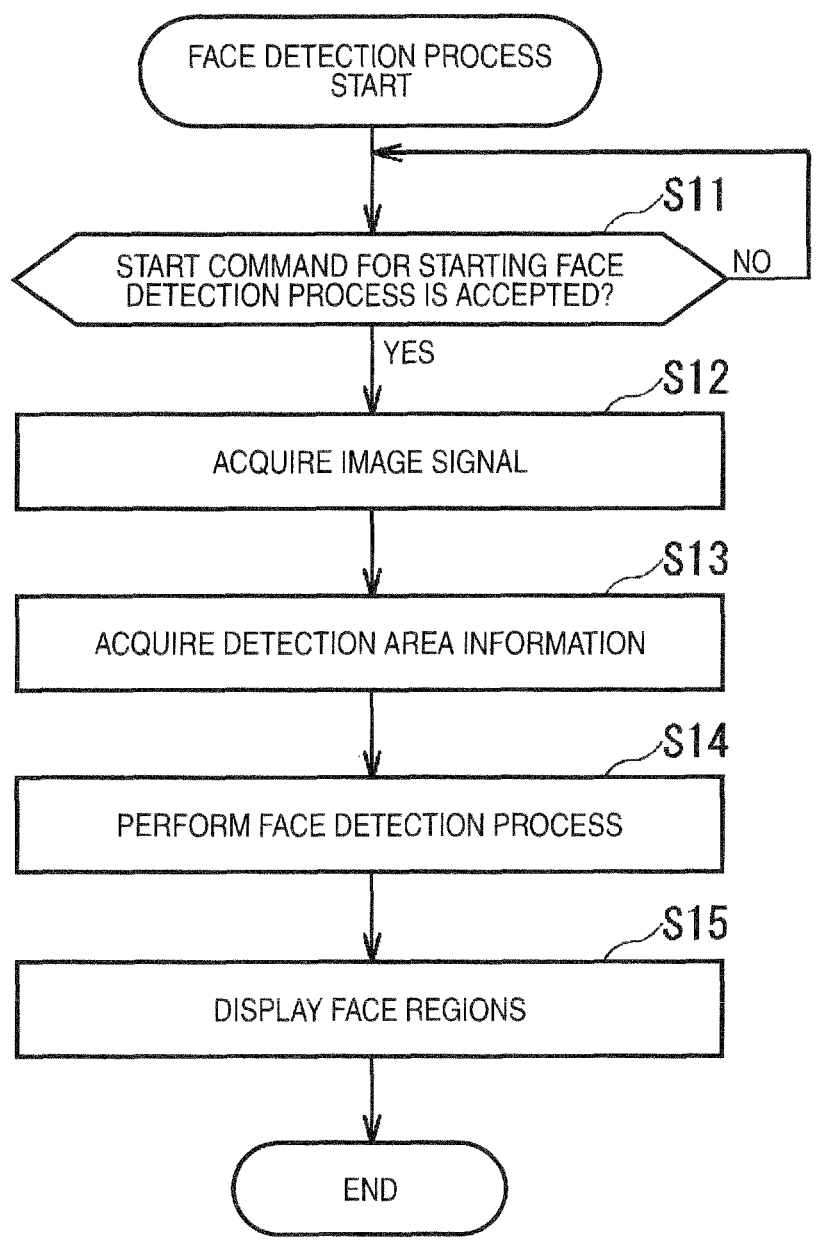
FIG. 6 is a flowchart for explaining a face detection process to be executed in the cellular phone according to the embodiment.

FIG. 6 is a flow chart for explaining the face detection process to be executed in the cellular phone 1 according to the embodiment. The face detection process shown in FIG. 6 will be explained on the assumption that the face detection process is executed in the cellular phone 1 having the camera 26, 27 where there is an unfocusable area regarded as impossible to focus thereon.

In Step S11, the main controller 30 determines whether an instruction to start the face detection process has been accepted or not. Through a predetermined operation key 14, the main controller 30 can accept the instruction to start the face detection process. For example, when the "*" key of the numeric keys 15 is pushed down, the main controller 30 accepts an instruction to start the face detection process.

In Step S12, the main controller 30 acquires an image signal which is acquired at every predetermined time interval by the image input module 39. In Step S13, the main controller 30 acquires detection area information about a detection area where face detection should be performed. The detection area information includes information about a focusable area which is an area in the image signal excluding any area regarded as impossible for the camera 26, 27 to focus thereon.

Figure 7:
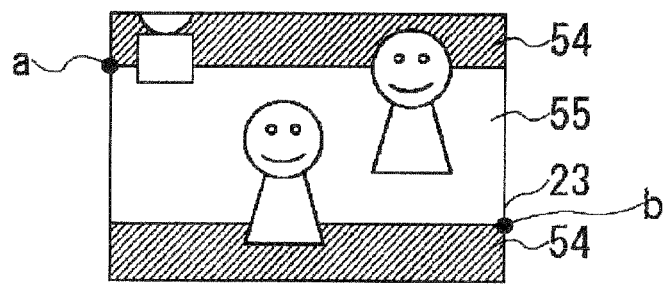
FIG. 7 is a view for explaining a detection area where the face detection process should be executed.

FIG. 7 is a view for explaining the detection area where the face detection process should be executed. A face detection area 55 designates a focusable area excluding unfocusable areas 54 and 54 shown by the shaded portions in FIG. 7. For example, the face detection area 55 corresponds to an area where the upper and lower 20% areas in FIG. 7 have been excluded from the captured and generated image signal. The main controller 30, for example, acquires the detection area information in the form of coordinate data indicating the focusable area as the face detection area 55. For example, the coordinate data indicating the focusable area include the coordinates of a point a and a point b of the face detection area 55 shown in FIG. 7.

Description has been made in the case where there are unfocusable areas in the upper and lower 20% of the image signal in FIG. 7, but the unfocusable areas are not limited thereto. Other areas may exist as the unfocusable areas.

In Step S14, the main controller 30 sends to the face detection module 40 the image signal and the detection area information acquired in Step S13 and makes the face detection module 40 execute the face detection process over an area based on the detection area information. The face detection module 40 generates information of a detected face-including region, for example, in the form of information including the coordinates of a central point of the face-including region and the size of the face-including region. The face detection module 40 supplies the generated information to the main controller 30.

Figure 8:
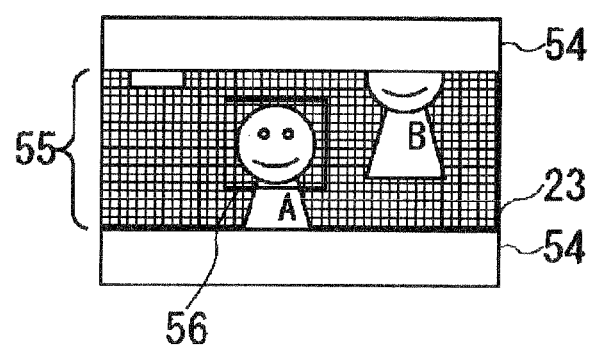
FIG. 8 is a view for explaining a case where a face detection module performs face detection.

FIG. 8 is a view for explaining a case where the face detection module 40 performs face detection. Only the captured image based on the image signal and corresponding to the face detection area 55 is shown in FIG. 8, where the face detection area 55 is hatched. As shown in FIG. 8, the face detection module 40 executes face detection on only the focusable area as the face detection area 55 based on the face detection area information. Therefore, a face-including region 56 is detected for the person A whose face is included in a region belonging to the focusable area, while no face-including region is detected for the person B whose face is included in a region that does not belong to the focusable area. The phrase "face is included in a region belonging to the focusable area" may be interpreted as "the central point of the face-including region is included in the face detection area" or as "the whole face-including region is included in the detection area".

In Step S15, the display controller 33 displays a face region based on a face-including region supplied from the face detection module 40 in accordance with the control of the main controller 30. The display controller 33 generates a frame to be displayed as the face region, and combines the frame with the captured image to display the face region as the detection result.

Figure 9A:
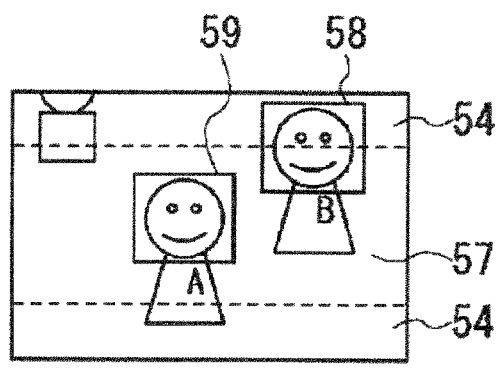
Figure 9B:
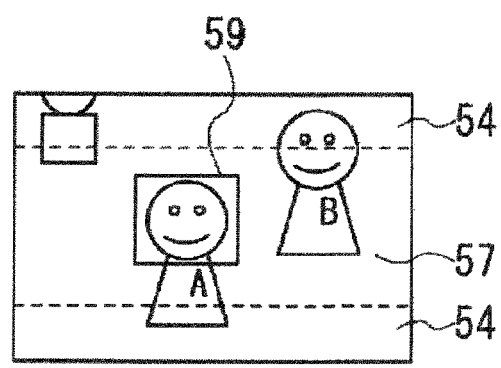

FIGS. 9A and 9B are views showing display examples of face regions based on detection results of face-including regions. FIG. 9A is a view showing a display example of a detection result of face detection performed on the whole of the image signal. FIG. 9B is a view showing a display example of a detection result of face detection performed upon a focusable area 57. The broken lines shown in FIGS. 9A and 9B indicate boundaries between the unfocusable areas 54 and the focusable area 57 respectively.

As shown in FIG. 9A, when the whole area of the image signal is set as a target of face detection, detection is performed even on a face-including region 58 located in any unfocusable area 54, 54, where focusing cannot be achieved. On the other hand, when the focusable area 57 of the image signal is set as a target of face detection as shown in FIG. 9B, only a face-including region 59 including a face located in the focusable area is detected. The face detection process has been explained above.

According to the face detection process, detection of face-including regions is performed not on the whole of the image signal but only on the focusable area, so that the area to be detected can be narrowed. Thus, the time of detection processed by the face detection module 40 can be shortened. That is, it is designed in advance that the detection process shall not be performed on any region where focusing cannot be achieved even if a face is detected in the region. Thus, processing for detecting face-including regions can be shortened.

In addition, it is designed in advance that the detection process shall not be performed on any region that can be regarded as impossible to focus thereon even if the region is detected as a face-including region. Thus, this embodiment is effective also in avoiding the situation where the user may select a face-including region where focusing cannot be achieved.

In the face detection process shown in FIG. 6, the area excluding the unfocusable areas is set as a target of detection. Otherwise, at least a part of the unfocusable areas may be included in the face detection area. In this case, only face regions included in the focusable area may be displayed in the stage where the face regions are displayed based on detected face-including regions.

Figure 10:
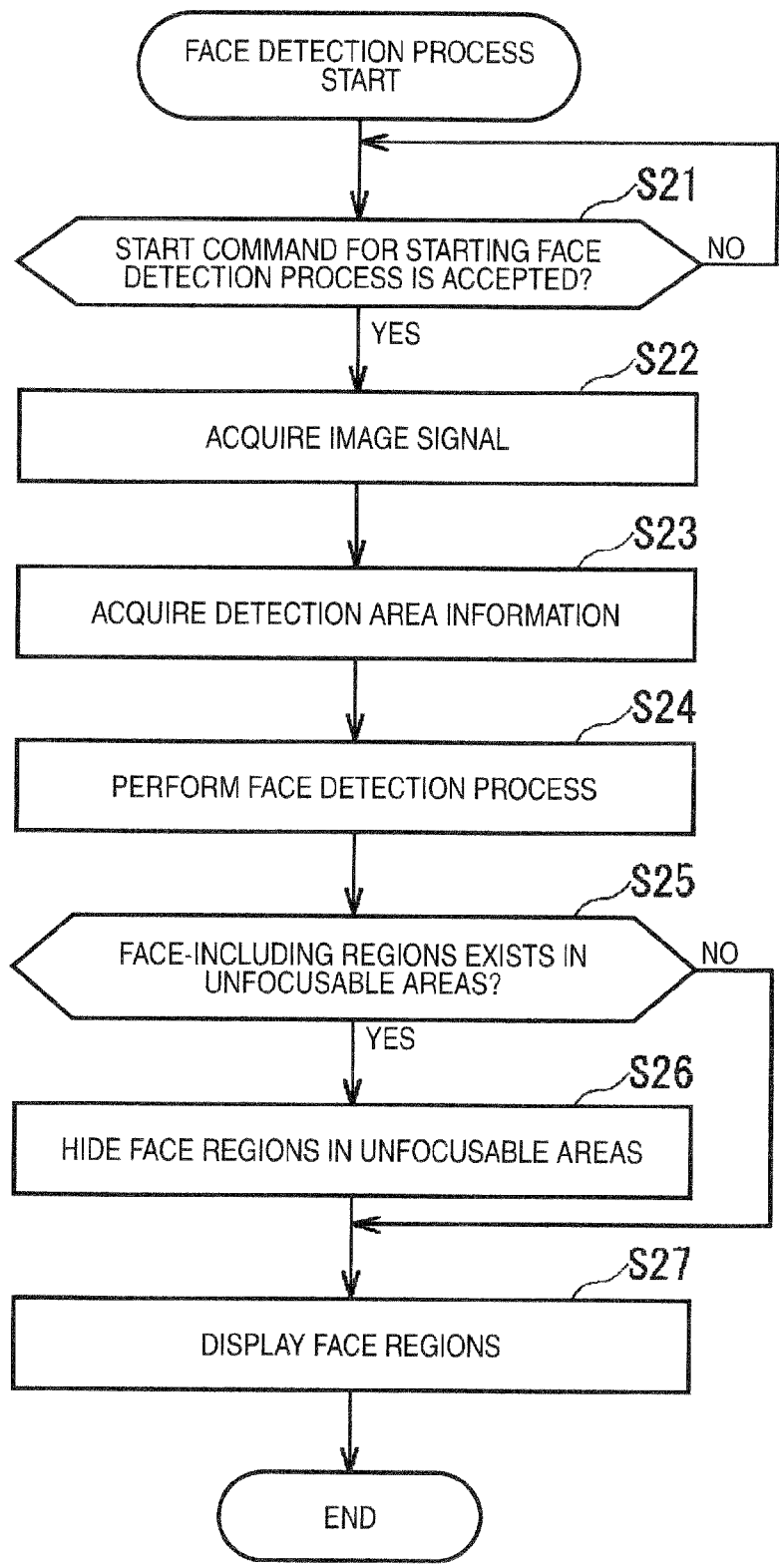
FIG. 10 is a flow chart for explaining another face detection process to be executed in the cellular phone according to the embodiment.

FIG. 10 is a flow chart for explaining another face detection process to be executed in the cellular phone 1 according to the embodiment. The face detection process explained in FIG. 10 will be described on the assumption that the process is executed in the cellular phone 1 having the camera 26, 27, where there is an unfocusable area regarded as impossible to focus thereon. Redundant description about parts corresponding to those of the face detection process shown in FIG. 6 will be omitted.

Steps S21 and S22 are substantially similar to Steps S11 and S12 of the face detection process shown in FIG. 6, and description thereof will be omitted.

In Step S23, the main controller 30 acquires detection area information about a detection area where face detection should be performed. The detection area information includes information about an area including the focusable area of the camera 26, 27 and at least a part of the unfocusable areas thereof.

Figure 11:
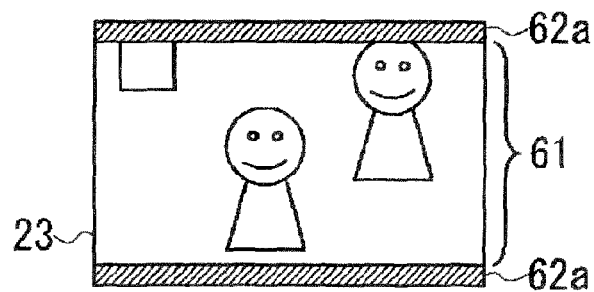
FIG. 11 is a view for explaining an area where the face detection process should be executed.

FIG. 11 is a view for explaining an area where the face detection process should be executed. A face detection area 61 in FIG. 11 is an area excluding unfocusable areas 62a shown by the shaded portions (for example; the upper and lower 10% areas in FIG. 11). For example, the main controller 30 acquires detection area information in the form of coordinate data indicating an area including the focusable area and at least a part of the unfocusable areas.

In Step S24, the main controller 30 controls the face detection module 40 to execute the face detection process based on the detection area information. The face detection module 40 generates information about a face-including region, for example, in the form of the coordinates of a central point of the face-including region and the size of the face-including region. The face detection module 40 supplies the generated information to the main controller 30.

Figure 12:
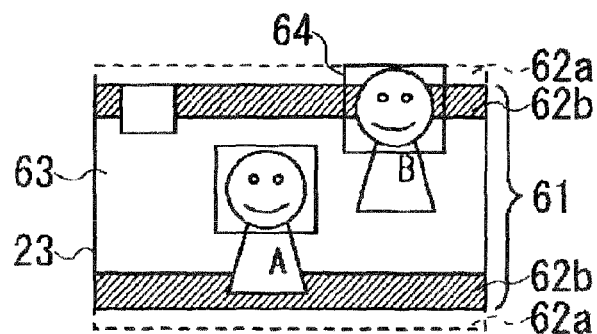
FIG. 12 is a view for explaining a case where the face detection module performs face detection.

FIG. 12 is a view for explaining a case where the face detection module 40 performs face detection. Only a captured image of a face detection area 61 is shown in FIG. 12, where the areas (parts of unfocusable areas) 62a and 62a other than the face detection area 61 are shown by the broken lines. In addition, the shaded areas designate unfocusable areas 62b and 62b included in the face detection area 61.

As shown in FIG. 12, the face detection module 40 executes face detection only on the face detection area 61 including a focusable area 63 and parts of unfocusable areas 62, based on the detection area information. Therefore, a region including a face of the person A whose face is included in the focusable area 63 and a region including a face of the person B whose face is included in the focusable area 63 and a part of the unfocusable area 62b as the face detection area 61 are detected.

In Step S25, the main controller 30 determines whether there is a detection result of a face-including region in an unfocusable area or not. The "case where there is a detection result of a face-including region in an unfocusable area", for example, corresponds to the case where the central point of a face-including region exists in an unfocusable area. In FIG. 12, a frame 64 of the face region of the person B indicates a frame in which the central point of a face-including region exists in an unfocusable area.

When the main controller 30 determines that there is no detection result of a face-including region in any unfocusable area, the main controller 30 skips the process to Step S27. On the contrary, when the main controller 30 determines that there is a detection result of a face-including region in an unfocusable area, in Step S26 the main controller 30 performs processing for hiding a frame of the face region existing in the unfocusable area.

In Step S27, in accordance with the control of the main portion 30, the display controller 33 displays the detection results of the face-including regions supplied from the face detection module 40 but excluding face regions set as hidden in Step S26. The display controller 33 generates frames as face regions, and combines the frames with the captured image to display the detection results.

Figure 13A:
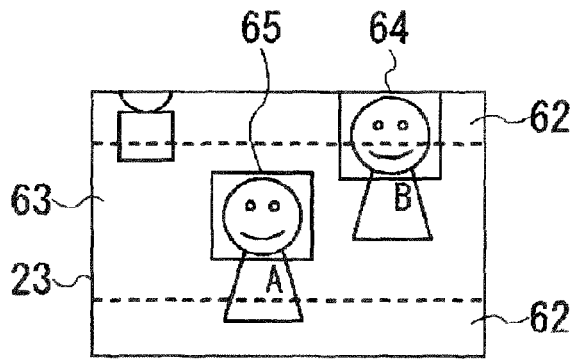
Figure 13B:
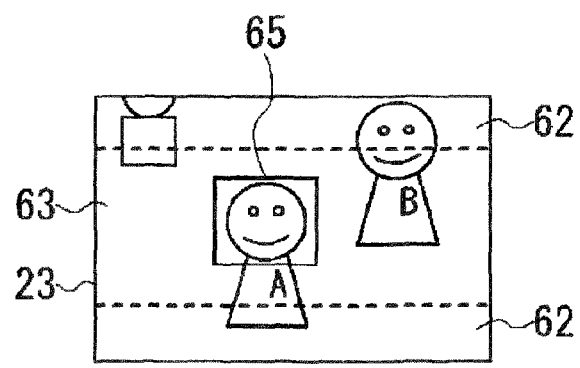

FIGS. 13A and 13B are views showing display examples of face regions based on detection results of face-including regions. FIG. 13A is a view showing an example where all the detected face regions are displayed as a detection result. FIG. 13B is a view showing an example where a detection result is displayed while a face region included in an unfocusable area is hidden. The broken lines shown in FIGS. 13A and 13B indicate boundaries between the unfocusable areas 62 and the focusable area respectively. Description will be made on the assumption that a frame 64 indicating a face region in FIG. 13B is a frame indicating a face region generated based on a region including a face whose central point exists in the unfocusable area 62.

As shown in FIG. 13A, when all the frames as the face regions based on the detected face-including regions are set to be displayed, the frame 64 indicating the face region for the detected face-including region existing in the unfocusable area 62 will be displayed even if focusing cannot be achieved therein. On the other hand, when only a frame 65 indicating a face region existing in the focusable area 63 is set to be displayed as shown in FIG. 13B, a detection result similar to that in the face detection process described in FIG. 6 can be displayed. The face detection process shown in FIG. 10 has been explained above.

According to the face detection process shown in FIG. 10, the process is performed only on the focusable area and a part of the unfocusable areas. Thus, the time required for the detection process can be shortened in comparison with that in the case where the face detection module 40 detects face-including regions in the whole captured image.

In the face detection process shown in FIG. 10, not only face-including regions detected in a focusable area but also unfocusable areas close to the focusable area are included in a target of face detection. As a result, if information of face-including regions existing in the unfocusable areas is accumulated, the face detection process can be performed based on the accumulated information of the face-including regions when any of the faces comes into the focusable area. Accordingly, the process can be performed faster and with higher accuracy than in the case where a new face moving into the focusable area is detected. Particularly when a person whose face is moved intensely is set as a subject, it may be considered that the face frequently moves between each unfocusable area and the focusable area. In this case, when the accumulated information of face-including regions existing in the unfocusable areas can be referred to, the face detection process can be performed faster and with higher accuracy than in the case where the process is performed only after the faces move into the focusable area.

The face detection area may be set freely by the user. For example, a plurality of modes may be provided with areas of different dimensions set as face detection areas so that the user can select one from the modes. Most of the unfocusable areas may be included in the face detection area to secure a large area for the face detection area. In such a mode, for example, if a person who frequently moves between each unfocusable area and the focusable area is a subject, the detection process can be performed faster and with higher accuracy as soon as the person moves from the unfocusable area to the focusable area. On the contrary, if a person who rarely moves but stays in the focusable area of a captured image is a main subject, the face detection process for an unnecessary area can be omitted by reducing the unfocusable areas included in the face detection area.

Next, details of the face selection process in Step S4 of the image capturing process shown in FIG. 4 will be described. The face selection process in the embodiment is a process which is effective in the case where one face region should be selected from face regions displayed based on a plurality of face-including regions by the face detection process of Step S3 of the image capturing process shown in FIG. 4.

Figure 14A:
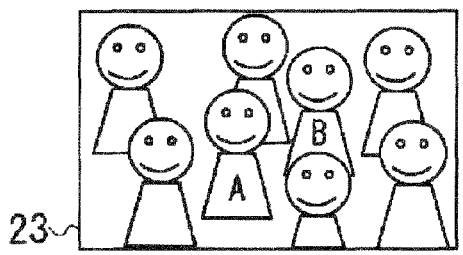
FIG. 14A is a view showing a display example of a captured image where face-including regions have not yet been detected.
Figure 14B:
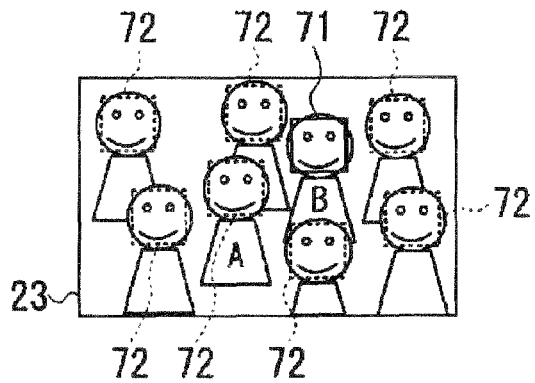
FIG. 14B is a view showing a display example of the captured image where face regions have been displayed.

FIG. 14A is a view showing a display example of a captured image where face-including regions have not yet been detected. FIG. 14B is a view showing a display example of the captured image where the face regions have been displayed. As shown in FIG. 14A, faces of eight persons are in the captured image. On this occasion, when the face detection process is executed, face regions including the detected faces of the eight persons are displayed as shown in FIG. 14B. A frame 71 shown by the solid line is displayed as a face region of a person B. The frame 71 indicates a face region in the selected state as a target of focusing. Frames 72, 72 . . . shown by the broken lines are displayed as the other face regions. The frames 72, 72 . . . indicate face regions in the unselected state.

When the user wants to set a person A as a target of focusing, for example, the user has to bring the selected state from the face region of the person B in the selected state to the face region of the person A. For example, the selection state can be changed whenever an input operation is accepted through a predetermined key of the operation keys 14 (for example, the "8" key of the numeric keys 15). Thus, a position based on a face region of a desired person can be set as a target of focusing.

On this occasion, if the face region of the person intended to be set as a target of focusing is displayed in the selected state just after it is displayed, a picture can be focus-controlled and captured without especially changing the face region in the selected state. When the face regions of the eight persons are detected and displayed as shown in FIG. 14B, a minimum of one input operation to a maximum of seven input operations have to be performed to change the selected state.

The face selection process which will be described below is a process which can easily and efficiently carry out such an operation to change the selected state. The face detection process to be executed in the cellular phone 1 according to the embodiment can be performed by any one of first to third face detection processes. The first face selection process is a face selection process based on a divisional face display manner in which face regions to be displayed are divided by a predetermined number and the predetermined number of face regions are displayed divisionally. The second face selection process is a face selection process based on a specific area detection/display manner in which only face regions in a specific area are detected or displayed. The third face selection process is a face detection process based on a fixed area detection/display manner in which only face-including regions in a fixed area are detected and face regions corresponding thereto are displayed. The first to third face selection processes will be described below specifically. Each face selection process that will be described below includes a part of steps of a face detection process, that is, includes the face detection step S3 and the face selection step S4 in FIG. 4.

Figure 15:
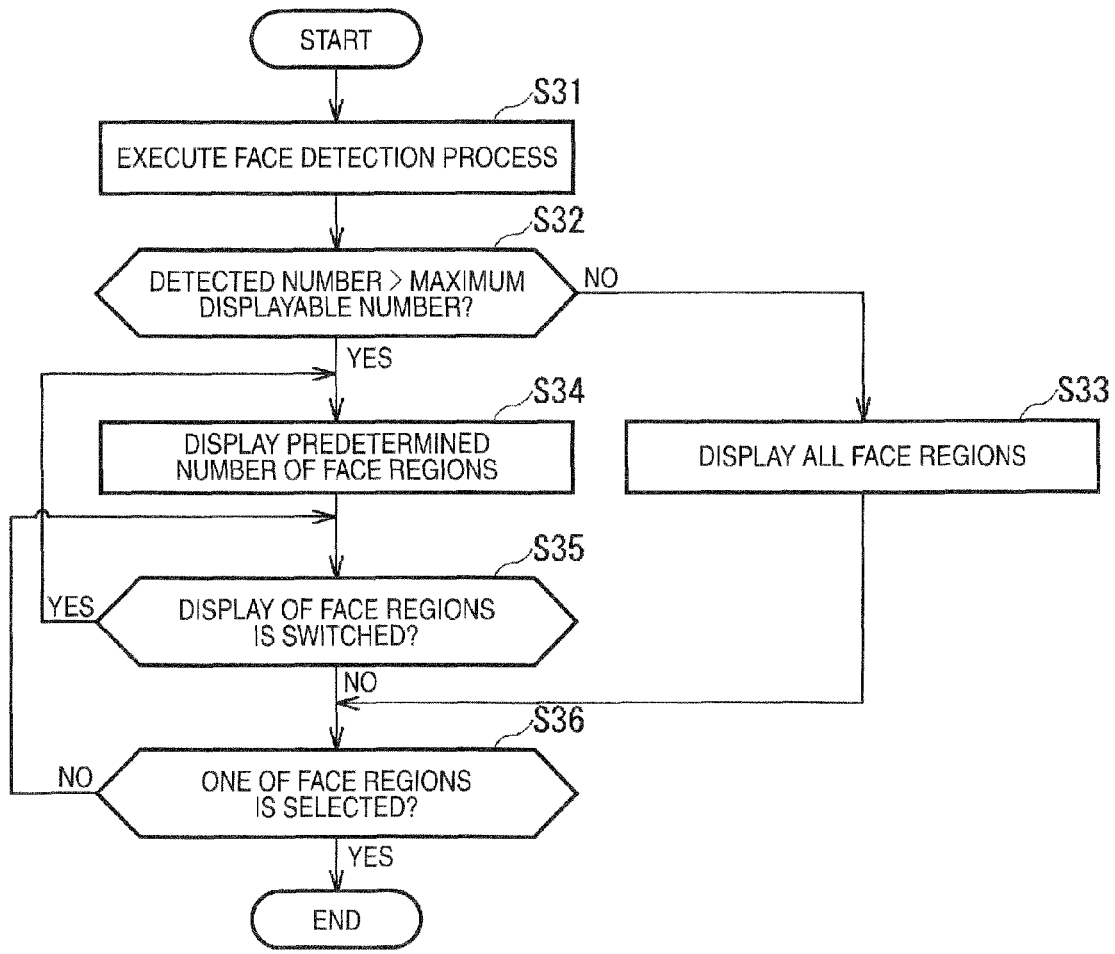
FIG. 15 is a flow chart for explaining a face selection process using a divisional display manner, which process should be executed in the cellular phone according to the embodiment.

FIG. 15 is a flow chart for explaining a face selection process using a divisional display manner, which process should be executed in the cellular phone 1 according to the embodiment. Assume that the maximum number of displayable face regions (frames displayed as the face regions) to be displayed on the main display 23 when a plurality of face-including regions are detected is set in advance in the face detection process shown in FIG. 15.

In Step S 31, the main controller 30 controls the face detection module 40 to execute a face detection process to detect subject face-including regions existing in the captured image. Step S31 is a face detection process corresponding to the aforementioned Step S3 in FIG. 4. The aforementioned face detection process shown in FIG. 6 or 10 may be executed as the face detection process in Step S31, or the face detection process may be executed not in consideration of a detection area but on the whole of the image signal.

In Step S32, the main controller 30 determines whether the number of the detected face-including regions is larger than a predetermined maximum displayable number or not. When the main controller 30 determines that the number of the detected face-including regions is smaller than the maximum displayable number (for example, 4), detection results of face regions are displayed based on all the face-including regions in Step S33.

On the contrary, when it is concluded that the number of the detected face-including regions is larger than the maximum displayable number, in Step S34 the display controller 33 as a display control unit divisionally displays a predetermined number of face-including regions of the detected face-including regions in accordance with the control of the main controller 30. That is, only a predetermined number of face regions are displayed while the other face regions are hidden. The numbers of the face regions displayed divisionally may be set as a combination of the maximum displayable number and the remaining number or may be divided so that the detected face regions are divided substantially equally.

The predetermined number of face regions displayed just after detection may include any face regions. For example, the captured image may be divided into predetermined areas (for example, two, left and right), or face regions existing in each split area may be displayed. Alternatively, face regions may be divisionally displayed in temporal order of detection, or a predetermined number of face regions may be displayed in order of increasing distance from the central point of the captured image.

Figure 16A:
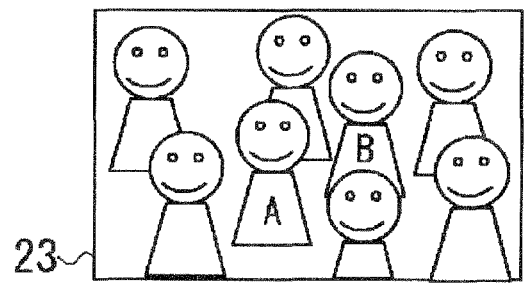
FIG. 16A is a view showing a display example of a captured image where face-including regions have not yet been detected.
Figure 16B:
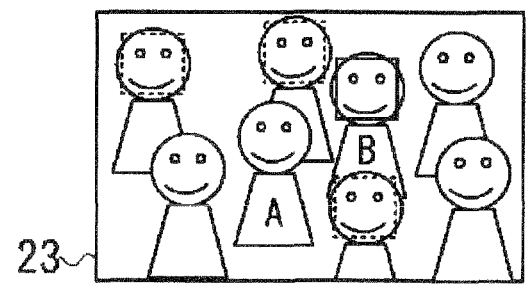
FIG. 16B is a view showing a display example of the captured image where a detection result has been divisionally displayed.
Figure 16C:
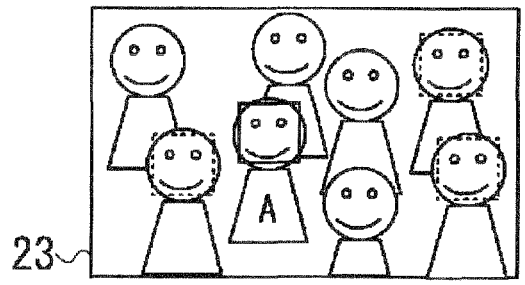
FIG. 16C is a view showing a display example of the captured image whose display has been switched from the display example of the captured image in FIG. 16B.

FIG. 16A is a view showing a display example of a captured image where face-including regions have not yet been detected. FIG. 16B is a view showing a display example of the captured image where detection results have been divisionally displayed. In FIGS. 16A-16C, assume that the maximum number of displayable face regions is set at 4. As shown in FIG. 16A, faces of eight persons are taken in the captured image. On this occasion, when the face detection process is executed (for example, when the "*" key of the numeric keys 15 is pushed down), face-including regions including the faces of the eight persons are detected by the face detection module 40. However, the maximum number of displayable face regions has been set at 4. Therefore, as shown in FIG. 16B, only four face regions corresponding to the maximum displayable number are divisionally displayed on the captured image.

In Step S35, the main controller 30 determines whether a display switch instruction to switch the display from the face regions displayed in the detection result display Step S34 to the remaining divisional face regions has been accepted or not. This display switch instruction is accepted, for example, as soon as a predetermined operation key 14 is pushed down. When the main controller 30 concluded that the display switch instruction has been accepted, the main controller 30 returns to the detection result display Step S34, where the display is switched from the currently displayed face regions to the remaining divisional face regions.

FIG. 16C is a view showing a display example of the captured image whose display has been switched from the display example of the captured image in FIG. 16B. For example, assume that the user wants to select the face region of the person A as a target of focusing but the frame to be displayed as the face region of the person A is not shown in FIG. 16B. In this case, the user pushes down a predetermined operation key 14 (for example, the "7" key of the numeric keys 15) in Step S35 to switch the display so that remaining detection results including the face region of the person A can be displayed as shown in FIG. 16C.

After the detection results are displayed in the detection result display Step S33, and when the display switch instruction has not been accepted in the display switch determination Step S35, the main controller 30 in Step S36 determines whether one face region has been selected or not. Whether one face region has been selected or not is determined, for example, based on whether a predetermined operation key 14 (for example, the "8" key of the numeric keys 15) in the condition that one face region has been selected from face regions has been pushed down to fix the selected state or not. When one face region has been selected, the operation is changed to follow only the face-including region, and detection of the other face-including regions and display of the face regions are suspended till the selection of the face region is canceled. When one face region is not selected, the main controller 30 returns to the display switch determination Step S35, where Step S35 and the following steps are repeated. The face selection process based on the divisional display manner has been explained above.

The face selection process based on the divisional display manner, which process should be executed in the cellular phone 1 according to the embodiment, is effective when there are many persons as subjects included in a captured image. For example, when more face regions than the maximum displayable number is detected, face regions are divisionally displayed in the face region display Step S34 so that the number of operations for selecting one from the displayed face regions can be reduced. On the other hand, when a desired face region is not included in the divisionally displayed face regions, the remaining face regions which are hidden can be displayed by a display switch instruction accepted in the display switch determination Step S35. The user can select a desired face region from the displayed face regions with a reduced number of operations.

For example, when the user wants to select the face region of the person A from the captured image shown in FIG. 14B, the user has to operate to move the selected state from the face region of the person B which is currently selected. On this occasion, when a predetermined operation key 14 is pushed down, the face region in the selected state moves in a predetermined direction (for example, from left to right). However, up to seven such input operations have to be performed to move the selected face region from the person B to the person A.

On the other hand, when the user wants to select the face region of the person A from the captured image shown in FIG. 16B just after the face selection process described in FIG. 15 is executed, the face region of the person A is hidden due to the divisional display of face regions. Here, when the user inputs a display switch instruction through a predetermined operation key 14, the remaining face regions including the face region of the person A but hidden in FIG. 16B are displayed as shown in FIG. 16C. On this occasion, when a predetermined operation key 14 is pushed down, the face region in the selected state moves in a predetermined direction. However, the selected face region can be moved to the person A by a small number of input operations (up to three input operations).

In this manner, when the number of detected face regions is not smaller than the maximum displayable number, the detected face regions are divided and a part of the face regions are displayed while the remaining part of the face regions is hidden. It is therefore possible to reduce the number of operations for selecting a face region.

The maximum displayable number is not limited to four as described in the embodiment, but may be set desirably. In addition, the number of display divisions of detected face regions is not limited to two as described in the embodiment, but may be larger than two, for example, three.

Next, description will be made on the second face selection process, that is, the face selection process based on the specific area display manner in which only face-including regions in a specific area are detected or only face regions in the specific area are displayed. The second face selection process can be achieved in two processing methods. The first processing method is a method in which face-including regions are detected from the whole of the captured image, and only face regions existing in a specific area are displayed for selection. The second processing method is a method in which face-including regions are detected in a specific area, and face regions based on the detected face-including regions are displayed for selection.

Figure 17:
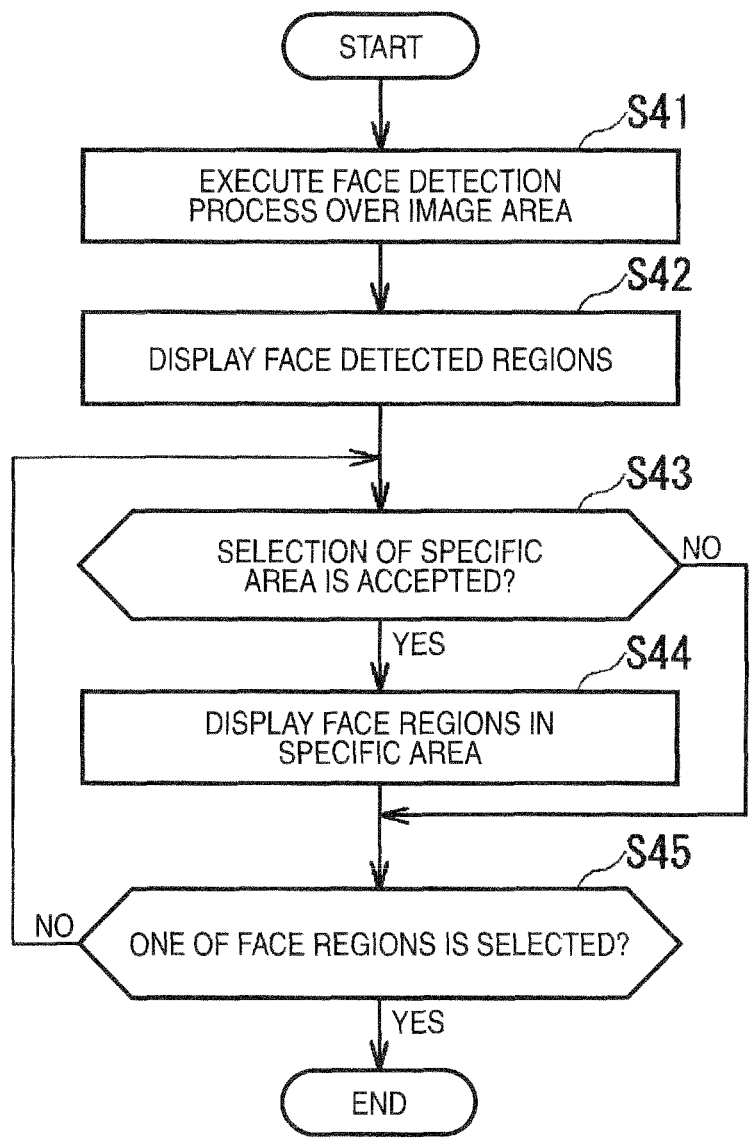
FIG. 17 is a flow chart for explaining a face selection process based on a specific area detection/display manner, to which process a first processing method is applied and which process should be executed in the cellular phone according to the embodiment.

First, the face selection process to which the first processing method is applied will be described. FIG. 17 is a flow chart for explaining the face selection process based on a specific area detection/display manner, to which process the first processing method is applied and which process should be executed in the cellular phone 1 according to the embodiment. Redundant description about steps corresponding to those of the aforementioned face selection process shown in FIG. 15 will be omitted.

Step S41 is similar to the face detection Step S31 in FIG. 15, and description thereof will be omitted.

In Step S42, the display controller 33 as a display control unit displays face regions based on the detected face-including regions in accordance with the control of the main controller 30. As the displayed face regions, all the detected face regions may be displayed. Alternatively, in the same manner as in the face selection process based on the divisional display manner in FIG. 15, the face regions may be divisionally displayed when the number of the face regions is larger than the maximum displayable number.

In Step S43, the main controller 30 determines whether selection of one area as a specific area from a predetermined number of areas into which the main display 23 (captured image) is divided has been accepted or not. The reason why selection of a specific area is accepted here is to display face regions based on face-including regions detected in the selected specific area and hide face regions based on face-including regions detected in the other areas.

Figure 18:
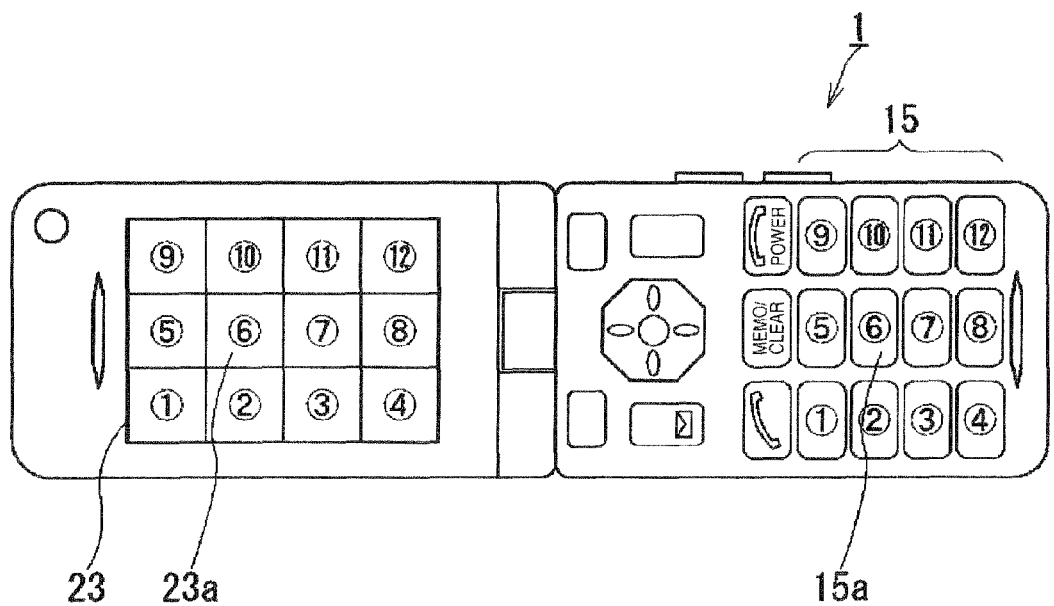
FIG. 18 is a view for explaining operation keys serving as a specific area selection unit.

FIG. 18 is a view for explaining operation keys 14 serving as a specific area selection unit. As shown in FIG. 18, the area of the main display 23 (captured image) are divided into twelve substantially equal areas. The twelve numeric keys 15 consisting of "0" to "9", "*" and "#" correspond to the twelve divisional areas of the main display 23. Numbers shown in the main display 23 and the numeric keys 15 are depicted for the sake of convenience of explanation. Those numbers may not actually be displayed on the screen of the main display 23.

When a numeric key 15 positionally corresponding to each region of the main display 23 is pushed down, the main controller 30 accepts selection of one region as a specific area. For example, when the user wants to select a "6" region 23a as a specific area on the main display 23 in FIG. 18, the user can select the specific area by pushing down a numeric key 15a indicated by "6" among the numeric keys 15 in FIG. 18.

When the main controller 30 determines in Step S43 that selection of a specific area has not been accepted, the main controller 30 skips the process to Step S45. On the contrary, when the main controller 30 determines in Step S43 that selection of a specific area has been accepted, the display controller 33 displays only face regions based on ones of the detected face-including regions existing in the specific area in accordance with an instruction of the main controller 30 in Step S44. That is, face regions existing out of the specific area among the face regions displayed in the face region display Step S42 are hidden. Whether a face-including region is in the specific area or not can be, for example, determined by whether the coordinates of the central point of the face-including region exist in the specific area or not.

Figure 19A:
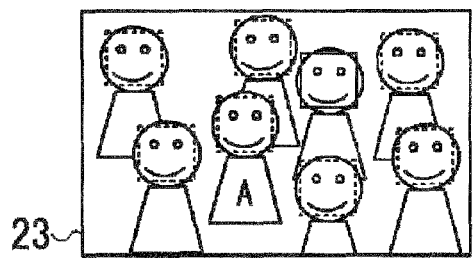
FIG. 19A is a view showing a display example of a captured image where face regions have been displayed all over the area of the captured image.
Figure 19B:
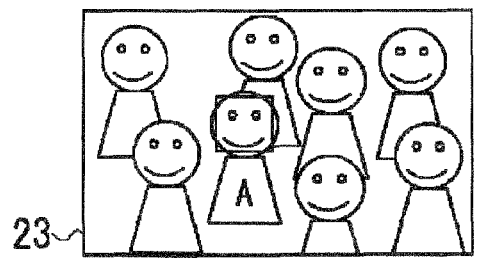
FIG. 19B is a view showing a display example of the captured image where only a face region existing in a specific area has been displayed.

FIG. 19A is a view showing a display example of a captured image where face regions have been displayed all over the area of the captured image. FIG. 19B is a view showing a display example of the captured image where only a face region existing in a specific area has been displayed. In FIG. 19A, the face regions are displayed based on all the detected face-including regions. Here, consider the case where the user wants to focus on the person A. However, if faces regions are displayed based on all the detected face-including regions, the number of input operations for moving the selected state to the face region of the person A will be increased.

On this occasion, when a numeric key 15 corresponding to the region where the person A exists is pushed down to select a specific area, only the face region of the person A included in the specific area is displayed as shown in FIG. 19B. The numeric key 15 pushed down at that time as shown in FIG. 18 is, for example, the numeric key 15a indicated by "6". Assume that the condition (posture) of the main display 23 (captured image) shown in FIGS. 19A and 19B corresponds to that of the main display 23 shown in FIG. 18.

Step 45 is substantially similar to the face region selection determination step S36 in FIG. 15, and description thereof will be omitted. The face selection process based on the specific area detection/display manner to which process the first processing method is applied has been completed.

In the face selection process based on the specific area display manner, to which process the first method is applied and which process should be executed in the cellular phone 1 according to the embodiment, face regions based on detected face-including regions in the whole of a captured image are displayed. After that, a specific area is selected, and only face regions existing in the selected area are displayed. As a result, the number of displayed face regions can be reduced. It is therefore possible to reduce the number of input operations required for selecting a face region to focus on from the reduced number of face regions.

For example, as described above, up to seven input operations may be required to move the selected state of a face region in order to select the face of the person A as a target of focusing from the face regions of eight persons as shown in FIG. 19A. However, when the numeric key 15 corresponding to the area where the face of the person A is located is pushed down to select a specific area, only the face region of the person A can be displayed as shown in FIG. 19B. When only the face region of the person A exists in the specific area as shown in FIG. 19B, the face region of the person A is shown in the selected state. The selected state can be fixed instantly, for example, when a predetermined operation key 14 is pushed down.

To select any divisional area of the main display 23 (captured image) as a specific area, a numeric key 15 corresponding to the divisional area positionally is pushed down in the aforementioned description. However, other operation keys 14 may be assigned for selecting the specific area.

Figure 20:
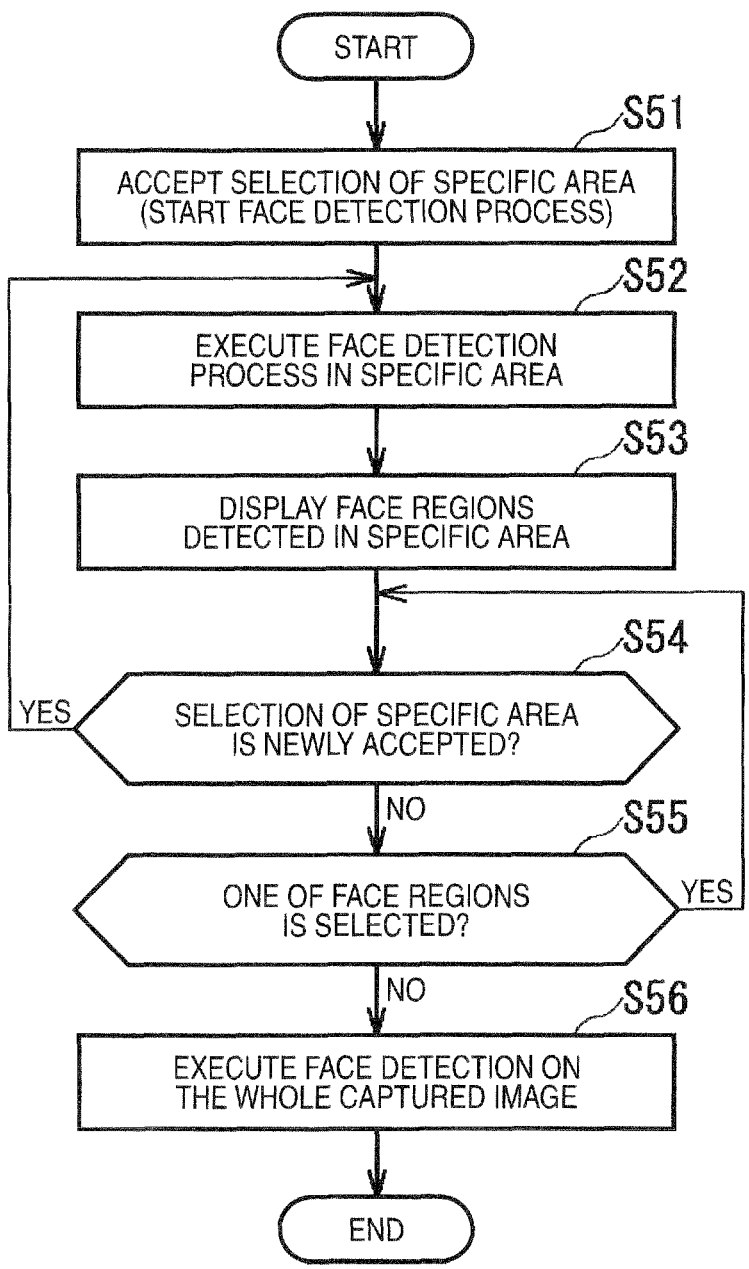
FIG. 20 is a flow chart for explaining a face selection process based on a specific area detection/display manner, to which process a second processing method is applied, and which process should be executed in the cellular phone according to the embodiment.

Next, the face selection process to which the second processing method is applied will be described. FIG. 20 is a flow chart for explaining the face selection process based on the specific area detection/display manner, to which process the second processing method is applied, and which process should be executed in the cellular phone 1 according to the embodiment. The face selection process explained in FIG. 20 is started after the captured image acquisition Step S2 in the image capturing process shown in FIG. 4. Redundant description about steps corresponding to those in the face selection processes in FIGS. 15 and 17 will be omitted.

In Step S51, the main controller 30 determines whether selection of one area as a specific area from a predetermined number of areas into which the captured image is divided has been accepted or not. The reason why selection of a specific area is accepted here is to detect face-including regions in the selected specific area and prevent detection of face-including regions in any other area. The selection of the specific area is substantially similar to the selection of the specific area described in the face selection process to which the first processing method is applied as shown in FIG. 17. Therefore, description about the selection of the specific area will be omitted.

In Step S52, the main controller 30 controls the face detection module 40 to execute the face detection process for detecting subject face-including regions in the specific area. The face detection process may be performed on an ambient predetermined area including the specific area selected in Step S51 (for example, on a widest area where the center of a face is located in the specific area).

In Step S53, the display controller 33 as a display control unit displays face regions based on the detected face-including regions in accordance with the control of the main controller 30. In Step S53, face detection is performed only in the specific area selected in the specific area selection Step S51. Thus, face-including regions existing in the specific area are detected, and face regions based on the detected regions are displayed.

In Step S54, the main controller 30 determines whether selection of a specific area has been newly accepted or not. When it is concluded that selection of a specific area has been newly accepted, the process returns to the face detection Step S52, where face detection in the specific area is executed again.

On the other hand, when it is concluded that selection of a specific area has not been newly accepted, in Step S55 the main controller 30 determines whether one face region has been selected or not. When the main controller 30 determines that one face region has not been selected, the process returns to the specific area selection determination Step S54 to repeat processing again. On the other hand, when the main controller 30 determines that one face region has been selected, in Step S56 a region based on the selected face region is tracked in the whole captured image even out of the area where the selected face-including region was detected. For example, assume that a person whose face region has been selected moves to another area than the specific area. In this case, a region including the face of the person is detected in the whole of the image signal even out of the specific area till the person leaves the captured image. The face selection process based on the specific area display manner to which the second processing method is applied has been completed.

In the face selection process based on the specific area display manner, to which process the second method is applied and which process should be executed in the cellular phone 1 according to the embodiment, the area where the face detection process should be executed can be narrowed in addition to effects similar to those when the first method in FIG. 17 is applied. The face selection process based on the specific area display manner is effective because the time of face detection can be shortened.

Figure 21:
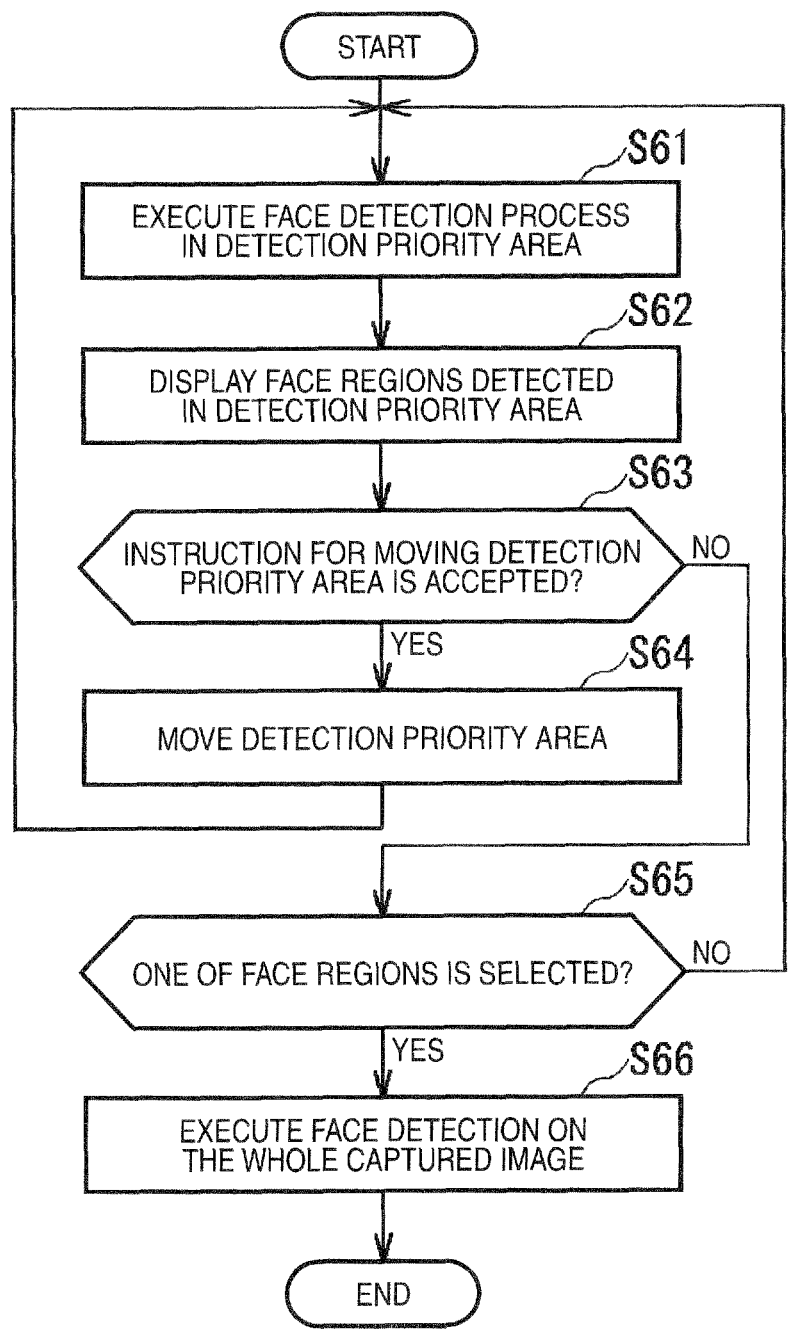
FIG. 21 is a flow chart for explaining a face selection process based on a fixed area display manner, which process should be executed in the cellular phone according to the embodiment.

Next, the face selection process based on the fixed area detection/display manner for detecting and displaying only face-including regions in a fixed area in the third face selection process will be described. FIG. 21 is a flow chart for explaining the face selection process based on the fixed area display manner, which process should be executed in the cellular phone 1 according to the embodiment. Redundant description about steps corresponding to those in the face selection processes in FIGS. 15, 17 and 20 will be omitted.

In Step S61, the main controller 30 controls the face detection module 40 to execute the face detection process. On this occasion, the face detection module 40 performs face detection in a detection priority area which is a fixed area in the captured image. In Step 62, in accordance with the control of the main controller 30, the display controller 33 displays face regions based on detection results of face-including regions supplied from the face detection module 40.

Figure 22A:
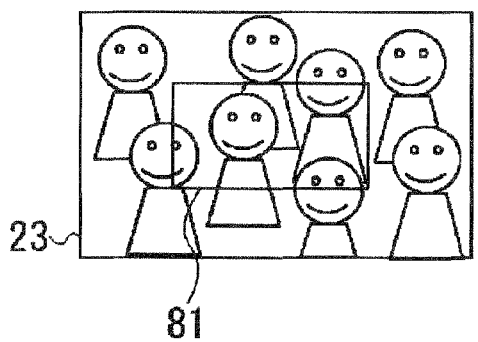
FIG. 22A is a view showing a display example of a captured image where a detection priority area on which face detection should be performed has been displayed.
Figure 22B:
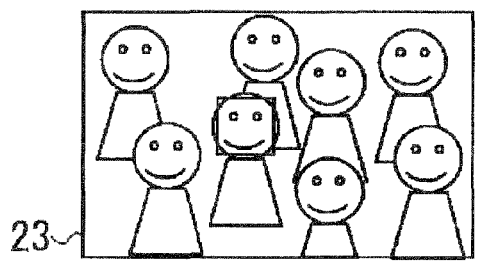
FIG. 22B is a view showing a display example of the captured image where a face region based on a face-including region detected in the detection priority area has been displayed.

FIG. 22A is a view showing a display example of a captured image where a detection priority area on which face detection should be performed has been displayed. FIG. 22B is a view showing a display example of the captured image where a face region based on a face-including region detected in the detection priority area has been displayed. As shown in FIG. 22A, a detection priority area 81 is displayed as a fixed area in the captured image. Face detection is performed in the detection priority area 81 by the face detection module 40. A face region based on a face-including region detected in the detection priority area 81 is displayed as shown in FIG. 22B.

The detection priority area 81 is displayed in the form of a solid-line frame in FIG. 22A. The display method is not limited to this form. For example, the inside of the detection priority area may be displayed in a different color from the color of the other areas, or the detection priority area may be hidden. As shown in FIG. 22B, the detection priority area 81 is hidden when a face region is detected. However, the display method is not limited thereto, but the detection priority area 81 may be always displayed even after a face region is detected.

The detection priority area may be designed so that the user can adjust the direction of the camera 26, 27 of the cellular phone 1 to perform face detection so that a face desired to focus on can be put in the detection priority area.

Figure 23A:
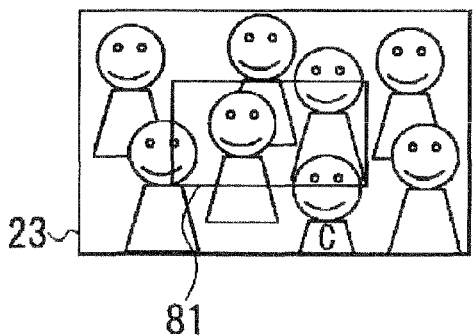
FIG. 23A is a view showing a display example of a captured image where a detection priority area on which face detection should be performed has been displayed.
Figure 23B:
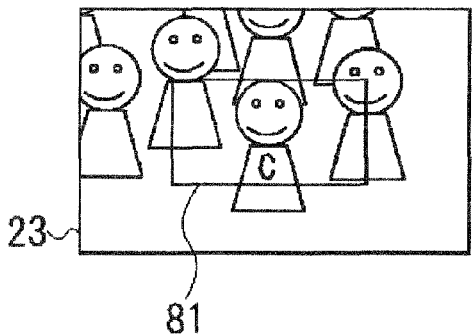
FIG. 23B is a view showing a display example of the captured image where a face region based on a face-including region detected in the detection priority area after the direction of a camera has been adjusted has been displayed.

FIG. 23A is a view showing a display example of a captured image where a detection priority area on which face detection should be performed has been displayed. FIG. 23B is a view showing a display example of the captured image where a face region based on a face-including region detected in the detection priority area after the direction of the camera 26, 27 has been adjusted has been displayed. Assume that the user wants to focus on a person C shown in FIG. 23A. In this case, the face of the person C is not included in the detection priority area 81. Therefore, the face cannot be detected. On this occasion, the user adjusts the direction of the camera 26, 27 of the cellular phone 1 to put the face of the person C in the detection priority area 81. Thus, the face of the person C can be detected.

In Step S63, the main controller 30 determines whether an instruction to move the detection priority area has been accepted or not. When the main controller 30 determines that an instruction to move the detection priority area has been accepted, in Step S64 the main controller 30 moves the detection priority area by a distance corresponding to the accepted instruction. In addition, when the instruction to move the detection priority area has been accepted, the process returns to Step S61, where the face detection process is performed again in the moved detection priority area by the face detection module 40.

The cellular phone 1 does not have to be provided with the function to move the detection priority area. When the function to move the detection priority area is not provided, the process skips Steps S63 and S64 and jumps from Step S62 to Step S66.

Figure 24A:
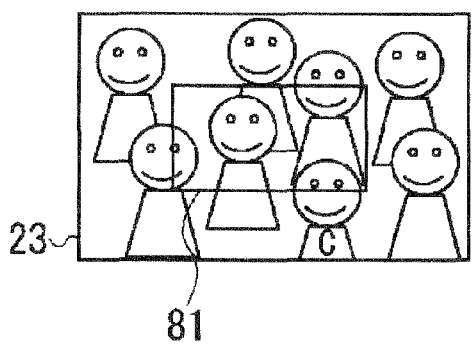
FIG. 24A is a view showing a display example of a captured image where a detection priority area on which face detection should be performed has been displayed.
Figure 24B:
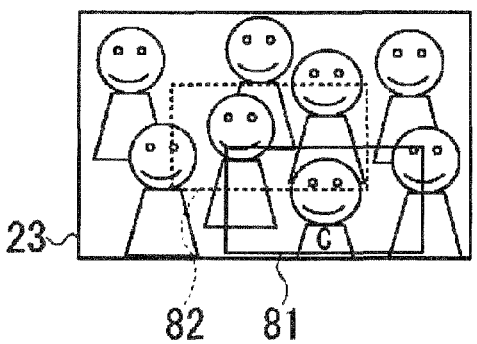
FIG. 24B is a view showing a display example of the captured image where the detection priority area has been moved.

FIG. 24A is a view showing a display example of a captured image where a detection priority area on which face detection should be performed has been displayed. FIG. 24B is a view showing a display example of the captured image where the detection priority area has been moved. For the sake of convenience of description, face regions based on detected face-including regions are not shown in FIGS. 24A and 24B. In addition, an area 82 shown by the broken line in the captured image in FIG. 24B designates the detection priority area which has not yet been moved, and the area shown by the solid line designates the detection priority area 81 which has been moved.

Assume that the user wants to focus on a person C shown in FIG. 24A. In this case, the face of the person C is not included in the detection priority area 81. Therefore, the face cannot be detected. On this occasion, the user operates a predetermined operation key 14 (for example, the cross keypad 16) to put the face of the person C in the detection priority area 81. Thus, a face-including region including the face of the person C can be detected.

In Step S65, the main controller 30 determines whether one face region has been selected or not. When the main controller 30 determines that one face region has not been selected, the main controller 30 returns to the face detection Step S61 to repeat processing again. On the other hand, when the main controller 30 determines that one face region has been selected, in Step S66 a face-including region based on the selected face region is tracked all over the captured image even out of the detection priority area where the face-including region was detected. The face selection process based on the fixed area detection/display manner has been completed.

In the face selection process based on the fixed area detection/display manner, which process should be executed in the cellular phone 1 according to the embodiment, the area to be subjected to the face detection process can be narrowed. The face selection process is effective because the time for face detection can be shortened. In addition, a fixed area is provided as a detection priority area in advance. Thus, the user does not have to specify the area where the user wants to detect faces. It is therefore possible to reduce the number of operations to select a face.

According to the cellular phone 1, by execution of the face detection process and the face selection process, face-including regions can be detected efficiently, or one face region can be selected easily from face regions displayed based on the detected face-including regions.

The invention can be applied not only to a cellular phone but also to a PDA (Personal Digital Assistants), a personal computer, a mobile game machine, a mobile music player, a mobile movie player, and any other mobile electronic device with a photographing function.

A series of process described in each embodiment of the invention may be implemented as software executed by a processor. However, the process may be implemented as a hardware configuration.

Further, steps of each flow chart shown in each embodiment of the invention by way of example are executed sequentially in a time sequence in the illustrated order. However, those steps do not have to be executed sequentially in a time sequence, but may include process to be executed in parallel or individually.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile electronic device comprising:
    a camera unit configured to capture a subject image and generate an image signal;
    a display unit configured to receive the image signal and display a captured image based on the image signal;
    an acquisition unit configured to acquire detection area information as information about a focusable area that is an area excluding an unfocusable area from the captured image, the focusable area and the unfocusable area each including one or more face images;
    a face detection unit configured to detect face-including regions, each of which including a face image of the subject included in the focusable area from the image signal, based on the detection area information; and
    a display control unit configured to control the display unit to display face regions on the captured image based on the face-including regions detected by the face detection unit.

* * * * *